United States Patent
Huang et al.

(10) Patent No.: US 12,524,463 B2
(45) Date of Patent: Jan. 13, 2026

(54) TWO-DIMENSIONAL CODE-BASED DATA PROCESSING METHOD, APPARATUS, AND SYSTEM

(71) Applicant: Shanghai Hode Information Technology Co., Ltd., Shanghai (CN)

(72) Inventors: Yaqin Huang, Shanghai (CN); Xiang Cao, Shanghai (CN); Haoran Wang, Shanghai (CN); Tianpeng Zhou, Shanghai (CN); Yi Dai, Shanghai (CN)

(73) Assignee: Shanghai Hode Information Technology Co., Ltd., Shanghai (CN)

( * ) Notice: Subject to any disclaimer, the term of this patent is extended or adjusted under 35 U.S.C. 154(b) by 50 days.

(21) Appl. No.: 18/694,857

(22) PCT Filed: Jun. 16, 2022

(86) PCT No.: PCT/CN2022/099261
§ 371 (c)(1),
(2) Date: Mar. 22, 2024

(87) PCT Pub. No.: WO2023/045430
PCT Pub. Date: Mar. 30, 2023

(65) Prior Publication Data
US 2025/0117426 A1 Apr. 10, 2025

(30) Foreign Application Priority Data

Sep. 24, 2021 (CN) .......................... 202111122335.7

(51) Int. Cl.
*G06F 16/70* (2019.01)
*G06F 16/71* (2019.01)
(52) U.S. Cl.
CPC .................... *G06F 16/71* (2019.01)

(58) Field of Classification Search
CPC ....................................................... G06F 16/71
See application file for complete search history.

(56) References Cited

U.S. PATENT DOCUMENTS

| 10,529,380 B2 * | 1/2020 | Hazan ................ G06V 30/224 |
| 2012/0069408 A1 * | 3/2012 | Tsutsumi ............ G06F 16/93 |
| | | 358/474 |

(Continued)

FOREIGN PATENT DOCUMENTS

| CN | 101281524 A | 10/2008 |
| CN | 104391938 A | 3/2015 |

(Continued)

OTHER PUBLICATIONS

International Patent Application No. PCT/CN2022/099261; Int'l Search Report; dated Sep. 15, 2022; 3 pages.

*Primary Examiner* — Kristopher Andersen
(74) *Attorney, Agent, or Firm* — BakerHostetler

(57) ABSTRACT

This application provides a two-dimensional code-based data processing method, apparatus, and system, where the two-dimensional code-based data processing method includes: receiving and parsing a material to be parsed to obtain a two-dimensional code and a target material, where the two-dimensional code carries target label information; recognizing the two-dimensional code to obtain the target label information; and storing the target material into a material library based on the target label information. The target material is quickly labeled based on the two-dimensional code, so that the target material is automatically imported into the corresponding material library, to help a user subsequently search for and manage the target material.

17 Claims, 4 Drawing Sheets

(56) References Cited

U.S. PATENT DOCUMENTS

| | | |
|---|---|---|
| 2014/0181155 A1 | 6/2014 | Homsany |
| 2015/0008257 A1* | 1/2015 | Beadles .......... G06K 19/06037 |
| | | 235/494 |
| 2016/0225131 A1 | 8/2016 | Babbar |
| 2019/0311747 A1 | 10/2019 | Boonmee |

FOREIGN PATENT DOCUMENTS

| | | |
|---|---|---|
| CN | 104484475 A | 4/2015 |
| CN | 106610787 A | 5/2017 |
| CN | 112115288 A | 12/2020 |
| CN | 112579694 A | 3/2021 |
| CN | 112749310 A | 5/2021 |
| CN | 113392131 A | 9/2021 |

\* cited by examiner

TWO-DIMENSIONAL CODE-BASED DATA PROCESSING METHOD, APPARATUS, AND SYSTEM

CROSS-REFERENCE TO RELATED APPLICATIONS

This application is the U.S. National Stage of International Application No. PCT/CN2022/099261, filed on Jun. 16, 2022, which claims priority to Chinese Patent Application No. 202111122335.7, filed on Sep. 24, 2021, and entitled "TWO-DIMENSIONAL CODE-BASED DATA PROCESSING METHOD, APPARATUS, AND SYSTEM", which are incorporated herein by reference in their entireties.

TECHNICAL FIELD

This application relates to the field of Internet technologies, and in particular, to a two-dimensional code-based data processing method. This application also relates to a two-dimensional code-based data processing apparatus, a two-dimensional code-based data processing system, a computing device, a computer-readable storage medium, and a computer program.

BACKGROUND

With the development of Internet technologies, videos have been developed from simple movies and television series to diversified forms, and increasingly more self-made videos are available to the public. People have a growing demand for recording videos. After recording videos by using a camera or a mobile phone, people need to transmit the videos to other terminals for processing and editing or sharing with WeChat Moments. In actual application, after transmission, the videos are generally sorted based on a modification date, a name, and the like. When a large quantity of videos are transmitted, a user may consume a large amount of time and effort to obtain a desired video through screening.

Therefore, how to resolve the foregoing problem and improve efficiency of screening materials by the user is a problem that urgently needs to be resolved at present.

SUMMARY

In view of this, embodiments of this application provide a two-dimensional code-based data processing method. This application also relates to a two-dimensional code-based data processing apparatus, a two-dimensional code-based data processing system, a computing device, a computer-readable storage medium, and a computer program, to resolve a problem in the conventional technology that a large amount of time and effort needs to be consumed during video screening due to an excessively large amount of video data.

According to a first aspect of the embodiments of this application, a two-dimensional code-based data processing method is provided, applied to a client device, and including:
 receiving and parsing a material to be parsed, to obtain a two-dimensional code and a target material, where the two-dimensional code carries target label information;
 recognizing the two-dimensional code to obtain the target label information; and
 storing the target material into a material library corresponding to the target label information.

According to a second aspect of the embodiments of this application, a two-dimensional code-based data processing method is provided, applied to a data processing system, where the system includes a first client device, a second client device, at least one recording device, and a server device, where
 the first client device generates a two-dimensional code, where the two-dimensional code carries target label information;
 the at least one recording device records the two-dimensional code and a target material to obtain a material to be parsed, and transmits the material to be parsed to the second client device;
 the second client device receives and parses the material to be parsed, to obtain the two-dimensional code and the target material, recognizes the two-dimensional code to obtain the target label information, stores the target material into a material library corresponding to the target label information, and uploads the target material and the target label information to the server device; and
 the server device stores the target material based on the target label information.

According to a third aspect of the embodiments of this application, a two-dimensional code-based data processing apparatus is provided, including:
 a parsing means, configured to receive and parse a material to be parsed, to obtain a two-dimensional code and a target material, where the two-dimensional code carries target label information;
 a recognition means, configured to recognize the two-dimensional code to obtain the target label information; and
 a storage means, configured to store the target material into a material library corresponding to the target label information.

According to a fourth aspect of the embodiments of this application, a two-dimensional code-based data processing system is provided, including a first client device, a second client device, at least one recording device, and a server device, where
 the first client device is configured to generate a two-dimensional code, where the two-dimensional code carries target label information;
 the at least one recording device is configured to record the two-dimensional code and a target material to obtain a material to be parsed, and transmit the material to be parsed to the second client device;
 the second client device is configured to receive and parse the material to be parsed, to obtain the two-dimensional code and the target material, recognize the two-dimensional code to obtain the target label information, store the target material into a material library corresponding to the target label information, and upload the target material and the target label information to the server device; and
 the server device is configured to store the target material based on the target label information.

According to a fifth aspect of the embodiments of this application, a computing device is provided, including a memory, a processor, and computer instructions stored in the memory and capable of running on the processor, where when the processor executes the computer instructions, steps of the two-dimensional code-based data processing method are implemented.

According to a sixth aspect of the embodiments of this application, a computer-readable storage medium is provided, where the computer-readable storage medium stores computer-executable instructions, and when the instructions are executed by a processor, steps of the two-dimensional code-based data processing method are implemented.

According to a seventh aspect of the embodiments of this specification, a computer program is provided, where when the computer program is executed on a computer, the computer is enabled to perform steps of the two-dimensional code-based data processing method.

According to the two-dimensional code-based data processing method provided in this application, the material to be parsed is received and parsed to obtain the two-dimensional code and the target material, where the two-dimensional code carries the target label information; the two-dimensional code is recognized to obtain the target label information; and the target material is stored into the material library corresponding to the target label information. The two-dimensional code included in the material to be parsed is recognized, so that location information for storing the target material can be determined, to determine a specific location of the target material in the material library. When a plurality of different recording devices generate a plurality of different materials based on a same two-dimensional code, the plurality of different materials may also be stored at a same location, to facilitate subsequent screening and processing by the user, thereby improving screening efficiency.

DESCRIPTION OF EMBODIMENTS

Figure 1:
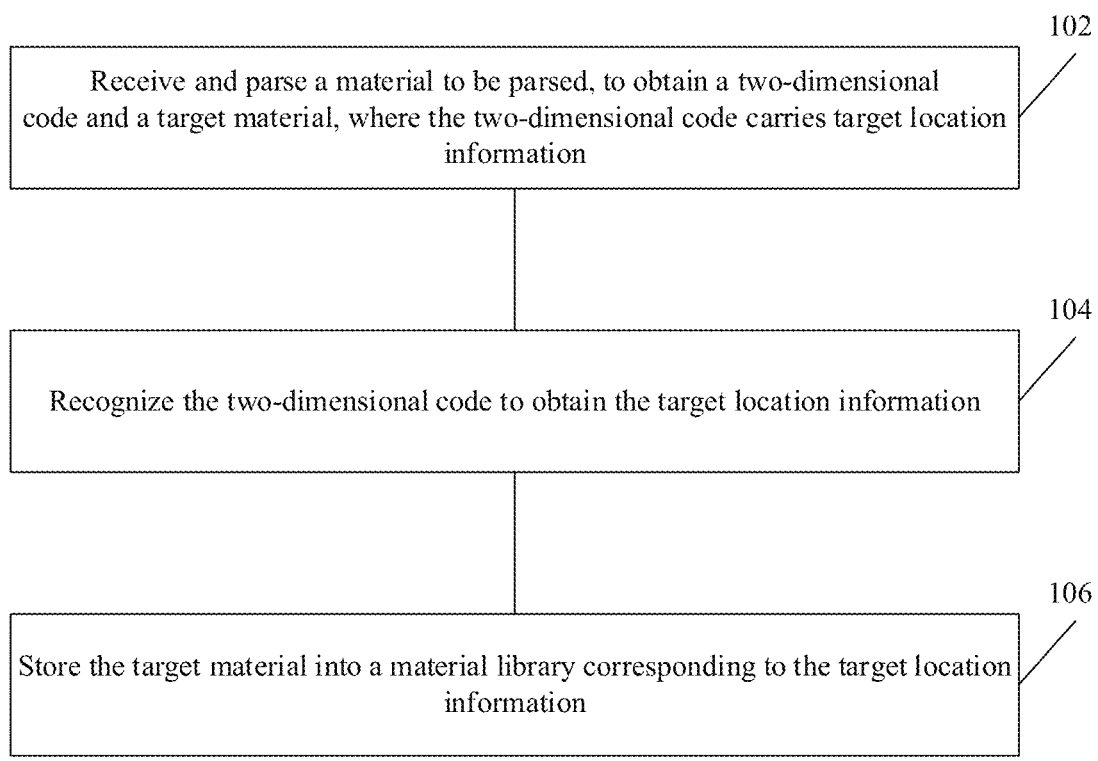
FIG. 1 is a flowchart of a two-dimensional code-based data processing method according to an embodiment of this application.

Many specific details are described in the following description to facilitate full understanding of this application. However, this application can be implemented in many other manners different from those described herein. A person skilled in the art can make similar promotion without departing from the connotation of this application. Therefore, this application is not limited to specific implementations disclosed below.

Terms used in one or more embodiments of this application are merely used to describe specific embodiments, and are not intended to limit the one or more embodiments of this application. The terms "a" and "the" that are in singular forms and that are used in one or more embodiments and the appended claims of this application are also intended to include plural forms, unless otherwise specified in the context clearly. It should be further understood that the term "and/or" used in one or more embodiments of this application indicates and includes any or all possible combinations of one or more associated listed items.

It should be understood that although the terms such as "first" and "second" may be used in one or more embodiments of this application to describe various types of information, the information should not be limited to these terms. These terms are merely used to distinguish between information of a same type. For example, without departing from the scope of the one or more embodiments of this application, "first" may also be referred to as "second", and similarly, "second" may also be referred to as "first". Depending on the context, for example, the word "if" used herein can be interpreted as "while", "when", or "in response to determining".

Terms used in the one or more embodiments of this application are explained first.

A data label is a specific location corresponding to a target material in a material library. For example, the target material belongs to a third shot in a second scene of a first story.

A material library is a specific location for storing the target material. Each material library corresponds to one shot. For example, a first shot in a first scene of a first story corresponds to a material library A. If a target material 1 belongs to the first shot in the first scene of the first story, the target material 1 is stored into the material library A.

A storyboard video editor is a video editor based on a storyboard script. In the storyboard video editor, a storyboard can be edited, and video shooting and video editing can be performed based on the storyboard.

A two-dimensional code is also referred to as a two-dimensional barcode. A common two-dimensional code is a QR code, and the full name of QR is Quick Response. The two-dimensional code is a popular encoding method on a mobile device in recent years. The two-dimensional code can store more information and indicate more data types than a conventional barcode.

This application provides a two-dimensional code-based data processing method. This application also relates to a two-dimensional code-based data processing apparatus and system, a computing device, a computer-readable storage medium, and a computer program. The two-dimensional code-based data processing method, the two-dimensional code-based data processing apparatus and system, the computing device, the computer-readable storage medium, and the computer program are described in detail in the following embodiments one by one.

FIG. 1 is a flowchart of a two-dimensional code-based data processing method according to an embodiment of this application. The method is applied to a client device, and specifically includes the following steps.

Step 102: Receive and parse a material to be parsed, to obtain a two-dimensional code and a target material, where the two-dimensional code carries target label information.

The client device includes but is not limited to any client device on which an application can run, such as a smartphone or a computer. For ease of understanding, the following describes the two-dimensional code-based data processing method in detail by using an example in which the two-dimensional code-based data processing method is applied to a computer.

The material to be parsed may be understood as a video material recorded by using a recording device, and the material to be parsed in this application is a video material that is recorded by using the recording device and that includes the two-dimensional code and the target material. The two-dimensional code may be understood as a two-dimensional code generated by using client device software, carries data label information such as a story, a scene, and a shot, and is unique and distinctive. Location information of a material may be determined by using the two-dimensional code. The target material may be understood as a video material recorded by a user. The target label information, i.e., target location information, may be understood as a logical location, that is, a specific shot in a specific scene of a specific story. One piece of target location information corresponds to one material library. Herein, the target label information may directly correspond to one or more physical storage locations. In other words, one or more physical storage locations are mapped to the target label information, so that the one or more physical storage locations correspond to logical locations of same or different stories, scenes, shots, and the like.

For example, if target label information carried in a two-dimensional code M is L, the target label information L is a first shot in a first scene of a first story, and a material library A is used to store a material of the first shot in the first scene of the first story, a target material labeled with the target label information L should be stored into the material library A. Alternatively, for example, if target label information carried in a two-dimensional code M is L, the target label information L is a first shot in a first scene of a first story, and both a material library A and a material library B are used to store a material of the first shot in the first scene of the first story, a target material labeled with the target label information L may be stored into the material library A or the material library B based on information such as a size of the target material and remaining space of the material library.

Specifically, after receiving the recorded material to be parsed, the client device performs parsing processing on the recorded material to be parsed, to obtain the two-dimensional code and the target material from the material to be parsed. The two-dimensional code carries the target label information.

In a specific embodiment of this application, a client device C receives a recorded video material V, and parses the video material V to obtain a two-dimensional code M and a target video V1. If target label information L carried in the two-dimensional code M is a first shot in a first scene of a first story, the target video V1 belongs to the first shot in the first scene of the first story, and the client device stores the target video V1 into a material library A.

After obtaining the two-dimensional code and the target material from the material to be parsed, the client device subsequently stores the target material at a specific location in the corresponding material library by using the target label information carried in the two-dimensional code.

In actual application, the parsing a material to be parsed, to obtain a two-dimensional code and a target material includes:

parsing the material to be parsed, to obtain a label material including the two-dimensional code and the target material; and extracting the two-dimensional code from the label material.

The label material may be understood as a material that includes a two-dimensional code. In actual application, the label material may be a segment of video that carries a two-dimensional code.

Specifically, the step of obtaining the two-dimensional code and the target material from the material to be parsed by the client device may be as follows: The client device parses the material to be parsed, to divide the material to be parsed into the label material and the target material; and after extracting the two-dimensional code from the label material to obtain the two-dimensional code and the target material, the client device may learn of specific location information of the target material by recognizing the two-dimensional code, and store the target material into the corresponding material library.

In a specific embodiment of this application, in the foregoing example, after the client device C parses the recorded video material V, the client device C obtains, from the video material V, a label video V2 including the two-dimensional code M and the target video V1 that needs to be stored, and then extracts the two-dimensional code M from the label video V2 including the two-dimensional code M.

Specifically, the parsing the material to be parsed, to obtain a label material including the two-dimensional code and the target material may be implemented in the following manner, including:

capturing the material to be parsed based on preset location information, to obtain the label material including the two-dimensional code and the target material.

The preset location information may be understood as preset location information of the two-dimensional code in the material to be parsed before material recording starts. For example, before recording of the target material starts, if it is set that the two-dimensional code is recorded 5 s before recording of the target material starts, the label material including the two-dimensional code is set to be at a location of the first 5 s of the material to be parsed; or if it is set that the two-dimensional code is recorded 5 s after recording of the target material ends, the label material including the two-dimensional code is set to be at a location of the last 5 s of the material to be parsed. Selection of the preset location information is not specifically limited in this application, and is subject to actual application.

Specifically, when the client device parses the recorded material to be parsed, the client device extracts, from the material to be parsed based on the preset location information at which the two-dimensional code appears, the label material including the two-dimensional code and the material video recorded by the user.

In a specific embodiment of this application, in the foregoing example, the client device C receives a segment of 60 s video V to be parsed, where the preset location information is "the first 5 s of the video to be parsed includes a two-dimensional code". When parsing the video to be parsed, the client device divides the video V to be parsed into the first 5 s of the video and the last 55 s of the video based on the preset location information. In this case, the first 5 s of the video is the label video V2 including the two-dimensional code, and the last 55 s of the video is the target video V1 recorded by the user.

The label material including the two-dimensional code is recorded based on the preset location information. Therefore, when parsing the material to be parsed, the client device can more quickly obtain the label material including the two-dimensional code and the target material from the material to be parsed based on the preset location information of the two-dimensional code.

In actual application, the parsing the material to be parsed, to obtain a label material including the two-dimensional code and the target material may be alternatively implemented in the following manner, including:

recognizing the material to be parsed based on an image recognition technology, to obtain the label material including the two-dimensional code and the target material The image recognition technology may be understood as recognizing a key image frame including a target image from an image to be recognized by using a trained image recognition model. The image recognition model may be used to recognize, from the video to be parsed, an image frame of the label material including the two-dimensional code. This application sets no specific limitation on selection of the image recognition model, provided that the image frame including the key image can be recognized from the video.

Specifically, when parsing the recorded material to be parsed, the client device may recognize, from the material to be parsed by using the image recognition technology, the label material including an image frame including the two-dimensional code and the target material including an image frame that does not include the two-dimensional code.

In a specific embodiment of this application, in the foregoing example, when the client device C receives a segment of 60 s video V to be parsed and needs to parse the video, the client device C recognizes the video V to be parsed by using the image recognition technology, and determines, through recognition, that image frames in the first 5 s of the video V to be parsed all include the two-dimensional code, and image frames in the last 55 s do not include the two-dimensional code. In this case, the client device uses, as the label video V2, a video including a key image frame that is in the first 5 s and that includes the two-dimensional code, and uses, as the target video V1 recorded by the user, a video including an image frame in the last 55 s.

When parsing the material to be parsed, the client device recognizes the label material including the two-dimensional code and the target material from the material to be parsed by using the image recognition technology, thereby improving parsing accuracy of the client device.

In actual application, after the extracting the two-dimensional code from the label material, the method further includes:

deleting the label material.

Specifically, after obtaining the two-dimensional code and the target material from the material to be parsed, the client device may perform deletion processing on the label material that includes the two-dimensional code and that is in the video material, so that a finally imported video material is a video material that does not include the two-dimensional code, thereby avoiding a case in which a manual deletion operation is subsequently required.

In a specific embodiment of this application, in the foregoing example, after extracting the two-dimensional code M, the client device C performs deletion processing on the label video V2 that includes the two-dimensional code M and that is in the video material V, and retains the target video V1 that needs to be stored. In actual application, segmentation between the label video V2 and the target video V1 may be determined based on a scene segmentation technology in the conventional technology. Alternatively, a video frame in which the two-dimensional code M appears may be used as a basis to use, as the label video V2, a video corresponding to n frames or m seconds before and after the video frame.

The client device receives and parses the material to be parsed, to obtain the two-dimensional code and the target material from the material to be parsed. After obtaining the two-dimensional code, the client device may delete the label material including the two-dimensional code, so that a subsequently stored video material does not include the two-dimensional code, to avoid a complex operation of manually deleting the two-dimensional code subsequently. In addition, the two-dimensional code is recognized, so that the client device stores the target material into the corresponding material library based on the target label information carried in the two-dimensional code, to quickly label and manage the material, and provide a more convenient method for subsequent searching or use by the user.

Specifically, after the client device obtains the label material including the two-dimensional code and the target material from the material to be parsed, the client device needs to extract the two-dimensional code from the label material including the two-dimensional code.

In a specific embodiment of this application, in the foregoing example, after the client device C obtains, from the segment of 60 s video, a segment of label video V2 whose duration is 5 s and that includes the two-dimensional code and another segment of target video whose duration is 55 s, the client device C needs to extract, for recognition, the two-dimensional code M from the label video V2 whose duration is 5 s, to obtain the target label information L.

In actual application, the client device may obtain the two-dimensional code by performing screenshot processing on the label video including the two-dimensional code. The client device may alternatively recognize, by using the foregoing image recognition technology, the label video including the two-dimensional code, and capture a frame picture including the two-dimensional code. A manner in which the client device obtains the two-dimensional code from the video is not specifically limited in this application, provided that a function of obtaining the two-dimensional code from the video can be implemented.

The client device extracts the two-dimensional code and the target video from the video to be parsed, so that the target label information of the target video is subsequently obtained by recognizing the two-dimensional code, to quickly store the target video at a corresponding location.

In actual application, before the client device receives the recorded material to be parsed, the method further includes:

generating a two-dimensional code, so that at least one recording device generates the material to be parsed based on the two-dimensional code.

Specifically, before the at least one recording device starts to officially record the target material, the client device needs to generate a two-dimensional code based on a data structure of the storyboard video editor. The two-dimensional code is used to identify specific location information of the target material, that is, a specific shot that is in a specific scene of a specific story and to which the target material belongs. In actual application, a plurality of different recording devices may generate a plurality of different materials for a same two-dimensional code, and store the plurality of different materials at a same location, to help the user subsequently manage the material.

In a specific embodiment of this application, the client device C generates a unique two-dimensional code M. The two-dimensional code carries label information such as a story, a scene, and a shot. Before the target video V1 is subsequently recorded by using the recording device, the two-dimensional code M is first recorded, and then the target material is recorded. After the recording is completed, the material to be parsed V that carries the two-dimensional code M and the target video V1 is obtained.

It should be noted that, in actual application, a same client device may complete two steps of generating the two-dimensional code and receiving and parsing the material to be parsed, or different client devices may separately complete two steps of generating the two-dimensional code and receiving and parsing the material to be parsed. Use of the client device is not specifically limited in this application.

In a specific embodiment of this application, the client device C1 generates the two-dimensional code M, where the two-dimensional code M carries the target label information L. The recording device generates, based on the two-dimensional code M that carries the target label information L, the label video V2 including the two-dimensional code, then starts recording the target video V1, finally generates the video V to be parsed, and sends the video V to be parsed to the client device C1.

In another specific embodiment of this application, the client device C1 generates the two-dimensional code M, where the two-dimensional code M carries the target label information L. The recording device generates, based on the two-dimensional code M that carries the target label information L, the label video V2 including the two-dimensional code, then starts recording the target video V1, finally generates the video V to be parsed, and sends the video V to be parsed to a client device C2.

The client device generates the two-dimensional code that carries the target label information. Therefore, when the recording device subsequently records the material to be parsed, the target material is labeled, and the target location of the target material is determined, to quickly label the target material.

Step 104: Recognize the two-dimensional code to obtain the target label information.

The target label information may include label information of the target material. For example, the target label information L may be a location in the material library A corresponding to the first shot in the first scene of the first story. That is, the target label information may reflect a specific shot that is in a specific scene of a specific story and to which the target material belongs.

Specifically, after the client device obtains the label material including the two-dimensional code and the target material from the material to be parsed, the client device needs to extract the two-dimensional code from the label material including the two-dimensional code, and after extracting the two-dimensional code, performs scanning recognition on the two-dimensional code to obtain the target label information carried in the two-dimensional code.

In a specific embodiment of this application, in the foregoing example, after extracting the two-dimensional code M from the label video including the two-dimensional code M, the client device C may obtain, by recognizing the two-dimensional code M, the target label information L carried in the two-dimensional code M.

The target label information of the target video may be quickly determined by recognizing the two-dimensional code in the label video, so that the target material is subsequently stored into the material library corresponding to the target label information based on the target label information of the target material.

Step 106: Store the target material into a material library corresponding to the target label information.

The material library may be understood as a place in which the target material is stored. In actual application, the material library A may be a storage location of the first shot of the first scene of the first story, and the material library B may be a storage location of the second shot of the first scene of the first story.

Specifically, after recognizing the two-dimensional code included in the label video, the client device obtains the target label information carried in the two-dimensional code, and may store the target material into the corresponding material library based on the target label information.

In a specific embodiment of this application, in the foregoing example, the client device C extracts the two-dimensional code M from the label video V2 whose duration is 5 s, and after recognizing the two-dimensional code M, determines the target label information L carried in the two-dimensional code M. Content of the target label information L is the first shot in the first scene of the first story. In this case, the client device may determine, based on the content of the target label information L, that the target video V1 whose duration is 55 s needs to be stored into the material library A.

The material library corresponding to the target material may be quickly determined by using the target label information carried in the two-dimensional code, to quickly import the material, and the target material may be labeled for subsequent searching and use.

In actual application, the storing the target material into a material library corresponding to the target label information includes:
determining the material library corresponding to the target material based on the target label information; and
storing the target material into the material library.

Specifically, to quickly import the target material into the material library, the following needs to be performed: The target material needs to be labeled, and a location for storing the target material is determined based on the label information. The client device obtains, by recognizing the two-dimensional code, the target label information carried in the two-dimensional code, determines the material library corresponding to the target material based on the target label information, and stores the target material into the material library, to quickly import and manage the target material.

In a specific embodiment of this application, in the foregoing example, before storing the target video V1 into the material library, the client device C needs to determine, based on the target label information L carried in the two-dimensional code M, a material library corresponding to the material video whose duration is 55 s. The client device may determine, based on the content (the first shot in the first scene of the first story) of the target label information L, that the target material belongs to the material library A, and store the target video V1 whose duration is 55 s into the material library A.

The material library corresponding to the target material may be quickly determined by using the target label information carried in the two-dimensional code, to quickly import the material, and the target material may be labeled for subsequent searching and use.

In actual application, after the client device stores the target material into the corresponding material library based on the target label information, the method further includes:
uploading the target material and the target label information to a server device.

Specifically, after the client device stores the target material into the corresponding material library based on the target label information, the client device has completed quick import and labeling of the local material. To implement synchronization of materials and label information between a plurality of client devices, the client device may upload the target material and the target label information corresponding to the target material to the server device. The server device may back up the target material and the target label information corresponding to the target material, so that another client device can obtain the latest stored target material and target label information corresponding to the target material from the server device. This implements data transmission and synchronization between the client devices.

In a specific embodiment of this application, in the foregoing example, after the client device C1 stores the target video V1 whose duration is 55 s into the material library A, the client device C1 has locally imported and labeled the target video V1, so that the user subsequently performs material searching and management operations on the client device C1. Then, the client device C1 uploads, to the cloud server device, the target video V1 stored in the material library A and the target label information L corresponding to the target video V1. In this case, another client device such as the client device C2 may locally download the target video V1 by using a cloud server device.

The client device uploads the target material and the target label information to the server device, so that the target material can be backed up. In addition, another client device can quickly find a required target material from the server device based on the target label information. Therefore, data synchronization of the target materials between different client devices is implemented, and labeling processing is performed on the target material, so that the user subsequently performs a management operation on a material on any client device.

According to the two-dimensional code-based data processing method in this application, the target material is quickly labeled by using the two-dimensional code, and the two-dimensional code that carries the label information is combined with the target material to generate the material to be parsed, so that specific information of the target material can be quickly labeled. In addition, the target material is automatically stored into the material library corresponding to the target material based on the specific information of the target material. When a plurality of different recording devices generate a plurality of different materials based on a same two-dimensional code, the plurality of different materials may also be stored at a same location, to facilitate subsequent screening and processing by the user, so that there is no need to consume a large amount of time and effort in performing screening processing on the materials, thereby improving screening efficiency, and facilitating a subsequent further management operation on the materials. The target material and the target label information of the target material may be uploaded to the server device, to implement multi-end data synchronization.

Figure 2:
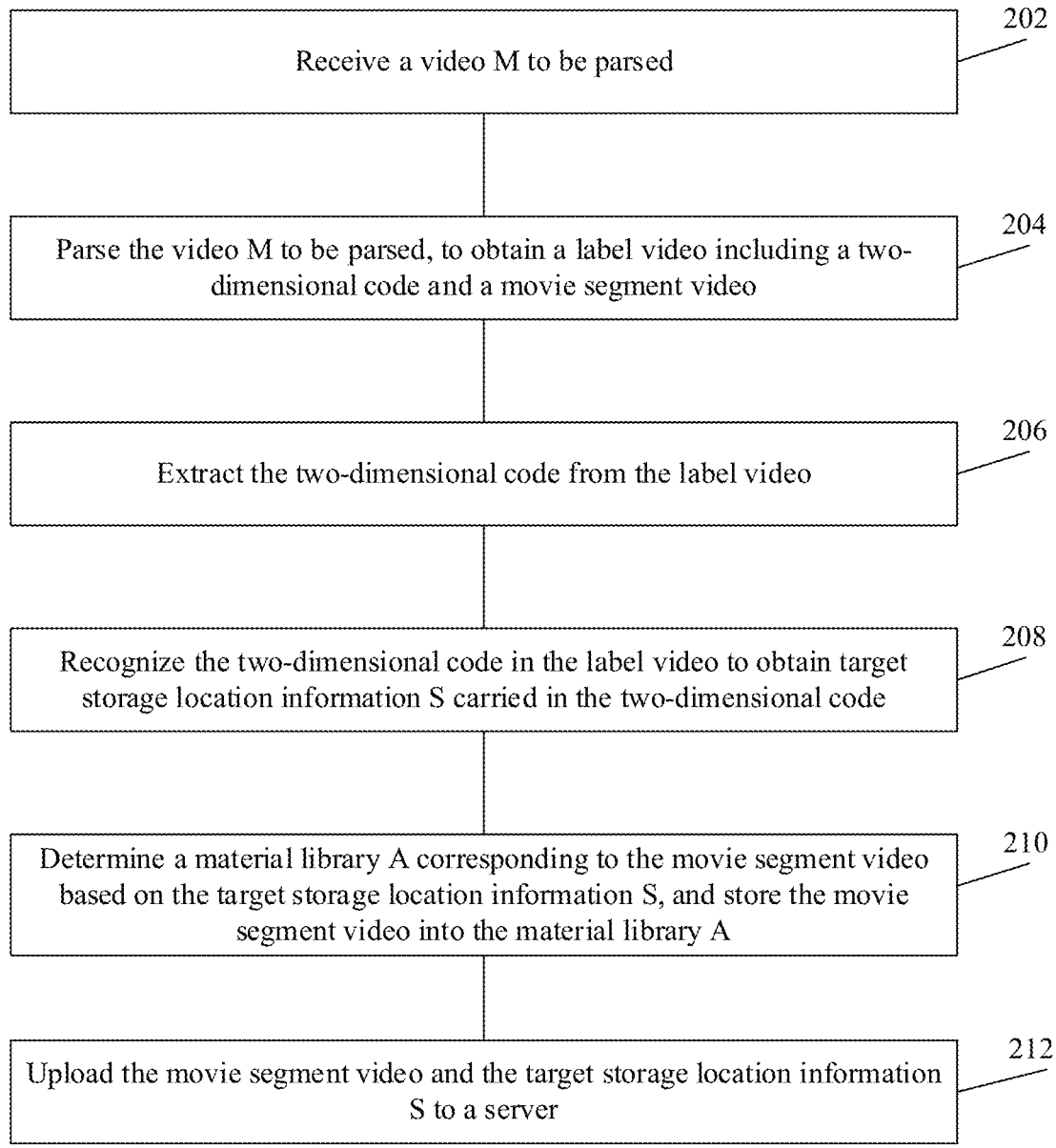
FIG. 2 is a processing flowchart of a two-dimensional code-based data processing method applied to filmmaking according to an embodiment of this application.

With reference to FIG. 2, the following further describes the two-dimensional code-based data processing method by using an example in which the two-dimensional code-based data processing method provided in this application is applied to filmmaking. FIG. 2 is a processing flowchart of a two-dimensional code-based data processing method applied to filmmaking according to an embodiment of this application. The method specifically includes the following step.

Step 202: Receive a video M to be parsed.

In a specific embodiment of this application, an example in which a client device is a computer is used. The video M to be parsed that is captured by a user and that includes a two-dimensional code and a movie segment video is received.

Step 204: Parse the video M to be parsed, to obtain a label video including the two-dimensional code and the movie segment video.

In a specific embodiment of this application, in the foregoing example, after the computer receives the video M to be parsed, the computer recognizes the video M to be parsed by using an image recognition technology, to determine, through recognition, an image frame that includes a two-dimensional code in the video M to be parsed, forms the label video by using the image frame that includes the two-dimensional code, and forms the movie segment video by using an image frame that does not include the two-dimensional code, to obtain the label video including the two-dimensional code and the movie segment video.

Step 206: Extract the two-dimensional code from the label video.

In a specific embodiment of this application, in the foregoing example, after the client device obtains the label video including the two-dimensional code and the movie segment video, the client device needs to extract the two-dimensional code from the label video.

Step 208: Recognize the two-dimensional code in the label video to obtain target label information S carried in the two-dimensional code.

In a specific embodiment of this application, in the foregoing example, after extracting the two-dimensional code from the label video, the computer deletes the label video including the two-dimensional code. The computer performs recognition processing on the two-dimensional code to determine the target label information S included in the two-dimensional code, where the target label information S is a first shot in a first scene of a first story.

Step 210: Determine a material library A corresponding to the movie segment video based on the target label information S, and store the movie segment video into the material library A.

In a specific embodiment of this application, in the foregoing example, after the computer obtains the target label information S, the computer may determine, based on the content (the first shot in the first scene of the first story) of the target label information S, that a corresponding location at which the movie segment video needs to be stored is the material library A, and store the movie segment video into the material library A.

Step 212: Upload the movie segment video and the target label information S to a server device.

In a specific embodiment of this application, in the foregoing example, after the computer stores the movie segment video into the corresponding material library A, the computer uploads the movie segment video and the target label information S to the server device, so that another client device such as a mobile phone can download the movie segment video and the target label information S from the server device, to implement data transmission and synchronization between a plurality of client devices.

According to the two-dimensional code-based data processing method applied to filmmaking in this embodiment, the computer may quickly label the movie segment video by using the target label information carried in the two-dimensional code, so that the computer automatically stores the movie segment video into the corresponding material library based on the target label information. After a plurality of movie segment videos that carry a same two-dimensional code are received, the plurality of different movie segment videos may be stored at a same location, so that the user subsequently performs quick searching and management in the plurality of movie segment videos. In addition, the movie segment video and the target label information are uploaded to the server device, to implement data transmission and synchronization between a plurality of client devices.

Figure 3:
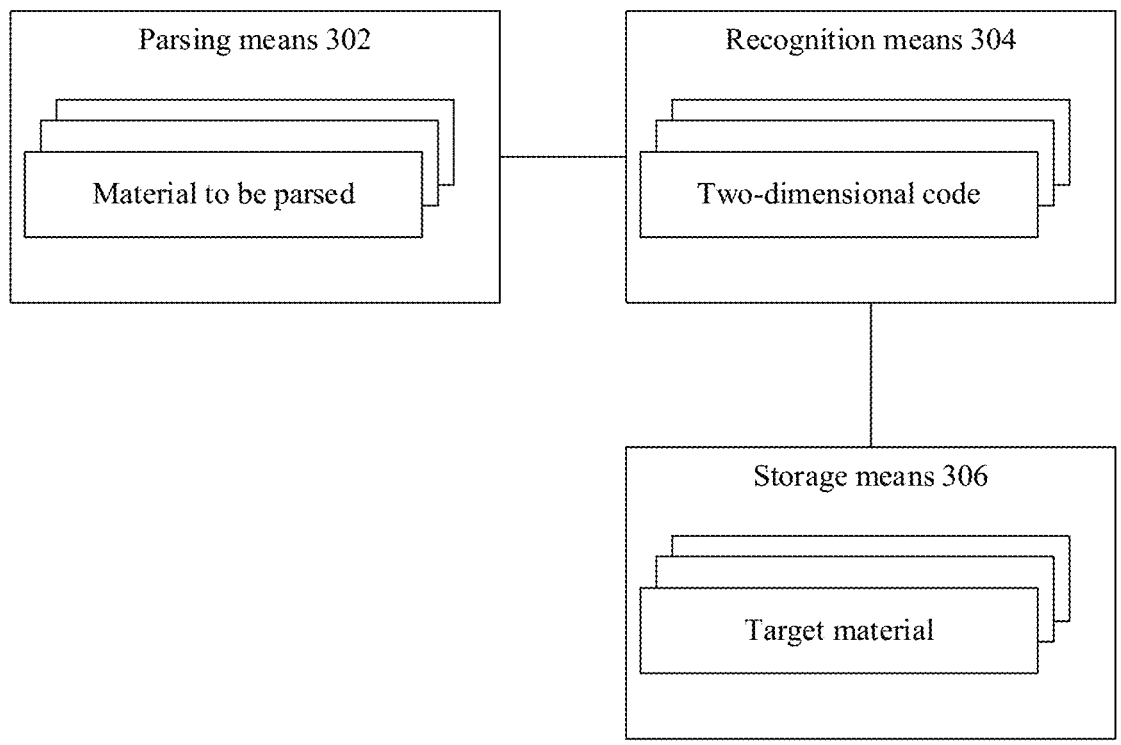
FIG. 3 is a schematic diagram of a structure of a two-dimensional code-based data processing apparatus according to an embodiment of this application.

Corresponding to the foregoing method embodiment, this application further provides an embodiment of a two-dimensional code-based data processing apparatus. FIG. 3 is a schematic diagram of a structure of a two-dimensional code-based data processing apparatus according to an embodiment of this application. As shown in FIG. 3, the apparatus includes:

a parsing means 302, configured to receive and parse a material to be parsed, to obtain a two-dimensional code and a target material, where the two-dimensional code carries target label information;

a recognition means 304, configured to recognize the two-dimensional code to obtain the target label information; and a storage means 306, configured to store the target material into a material library corresponding to the target label information.

Optionally, the parsing means 302 is further configured to:
parse the material to be parsed, to obtain a label material including the two-dimensional code and the target material; and
extract the two-dimensional code from the label material.

Optionally, the parsing means 302 is further configured to:
delete the label material.

Optionally, the parsing means 302 is further configured to:
capture the material to be parsed based on preset location information, to obtain the label material including the two-dimensional code and the target material.

Optionally, the parsing means 302 is further configured to:
recognize the material to be parsed based on an image recognition technology, to obtain the label material including the two-dimensional code and the target material Optionally, the storage means 306 is further configured to:
determine the material library corresponding to the target material based on the target label information; and
store the target material into the material library.

Optionally, the apparatus further includes:
an upload means, configured to upload the target material and the target label information to a server device.

Optionally, the apparatus further includes:
a generation means, configured to generate a two-dimensional code, so that a recording device generates the material to be parsed based on the two-dimensional code.

The two-dimensional code-based data processing method applied to a client device in this application includes: the parsing means, configured to receive and parse the material to be parsed, to obtain the two-dimensional code and the target material, where the two-dimensional code carries the target label information; the recognition means, configured to recognize the two-dimensional code to obtain the target label information; and the storage means, configured to store the target material into the material library corresponding to the target label information.

In this application, the two-dimensional code-based data processing apparatus applied to a client device implements parsing processing on the material to be parsed, and stores the target material into the corresponding material library based on the target label information obtained through parsing. When a plurality of target materials are generated based on a same two-dimensional code, the plurality of target materials may be stored into a same material library, so that a user subsequently quickly searches for and manages the target material.

The foregoing describes a schematic solution of a two-dimensional code-based data processing apparatus in an embodiment. It should be noted that the technical solution of the two-dimensional code-based data processing apparatus belongs to a same concept as the technical solution of the two-dimensional code-based data processing method. For details not described in detail in the technical solution of the two-dimensional code-based data processing apparatus, refer to descriptions of the technical solution of the two-dimensional code-based data processing method.

Figure 4:
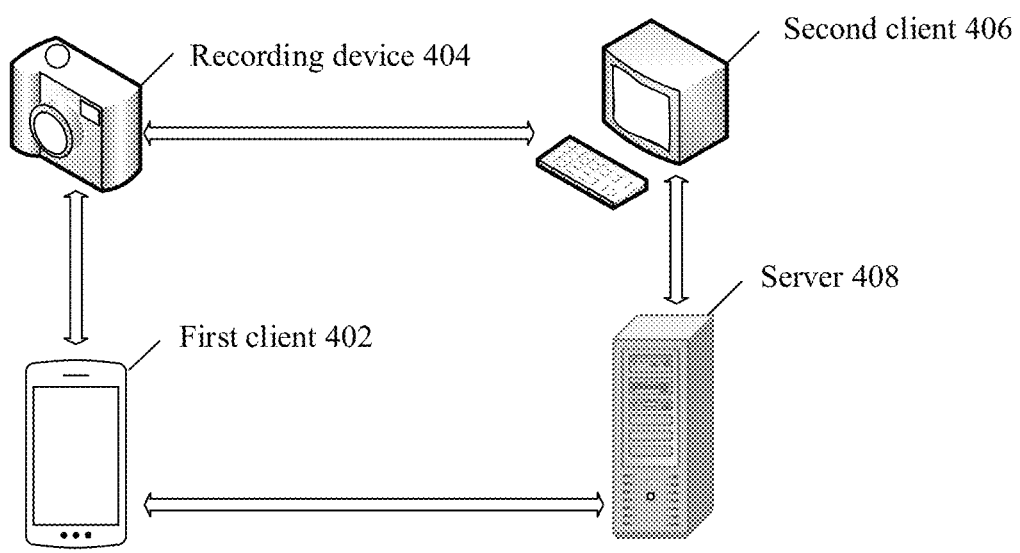
FIG. 4 is a schematic diagram of a structure of a two-dimensional code-based data processing system according to an embodiment of this application.

Corresponding to the foregoing method embodiment, this application further provides an embodiment of a two-dimensional code-based data processing system. FIG. 4 is a schematic diagram of a structure of a two-dimensional code-based data processing system according to an embodiment of this application. As shown in FIG. 4, the system includes a first client device 402, a second client device 406, a recording device 404, and a server device 408.

The first client device 402 is configured to generate a two-dimensional code, where the two-dimensional code carries target label information.

The recording device 404 is configured to record the two-dimensional code and a target material to obtain a material to be parsed, and transmit the material to be parsed to the second client device.

The second client device 406 is configured to receive and parse the material to be parsed, to obtain the two-dimensional code and the target material, recognize the two-dimensional code to obtain the target label information, store the target material into a material library corresponding to the target label information, and upload the target material and the target label information to the server device.

The server device 408 is configured to store the target material based on the target label information.

In a specific embodiment of this application, a first client device C1 generates a two-dimensional code M based on label information such as a story, a scene, and a shot, where the two-dimensional code M carries target label information L.

A recording device R records the two-dimensional code M to generate a label video V2 including the two-dimensional code M and a target video V1, generates a video V to be parsed, and sends the video V to be parsed to a second client device C2.

After receiving the video V to be parsed, the second client device C2 performs parsing processing on the video V to be parsed, to obtain the two-dimensional code M and the target video V1, recognizes the two-dimensional code M to obtain the target location L of the target video, stores the target video V1 into a corresponding material library based on the target label information L, and sends the target label information L and the target video V1 to a server device.

After receiving the target label information L and the target video V1, the server device stores the target video V1 to a corresponding material library.

Optionally, the server device 408 is further configured to send the target label information and the target material to another client device.

In a specific embodiment of this application, the server device may send the received target label information L and the received target video V1 to another client device, to implement data synchronization and transmission between a plurality of client devices.

The foregoing describes a schematic solution of a two-dimensional code-based data processing system in an embodiment. It should be noted that the technical solution of the two-dimensional code-based data processing system belongs to a same concept as the technical solution of the two-dimensional code-based data processing method. For details not described in detail in the technical solution of the two-dimensional code-based data processing system, refer to descriptions of the technical solution of the two-dimensional code-based data processing method.

Figure 5:
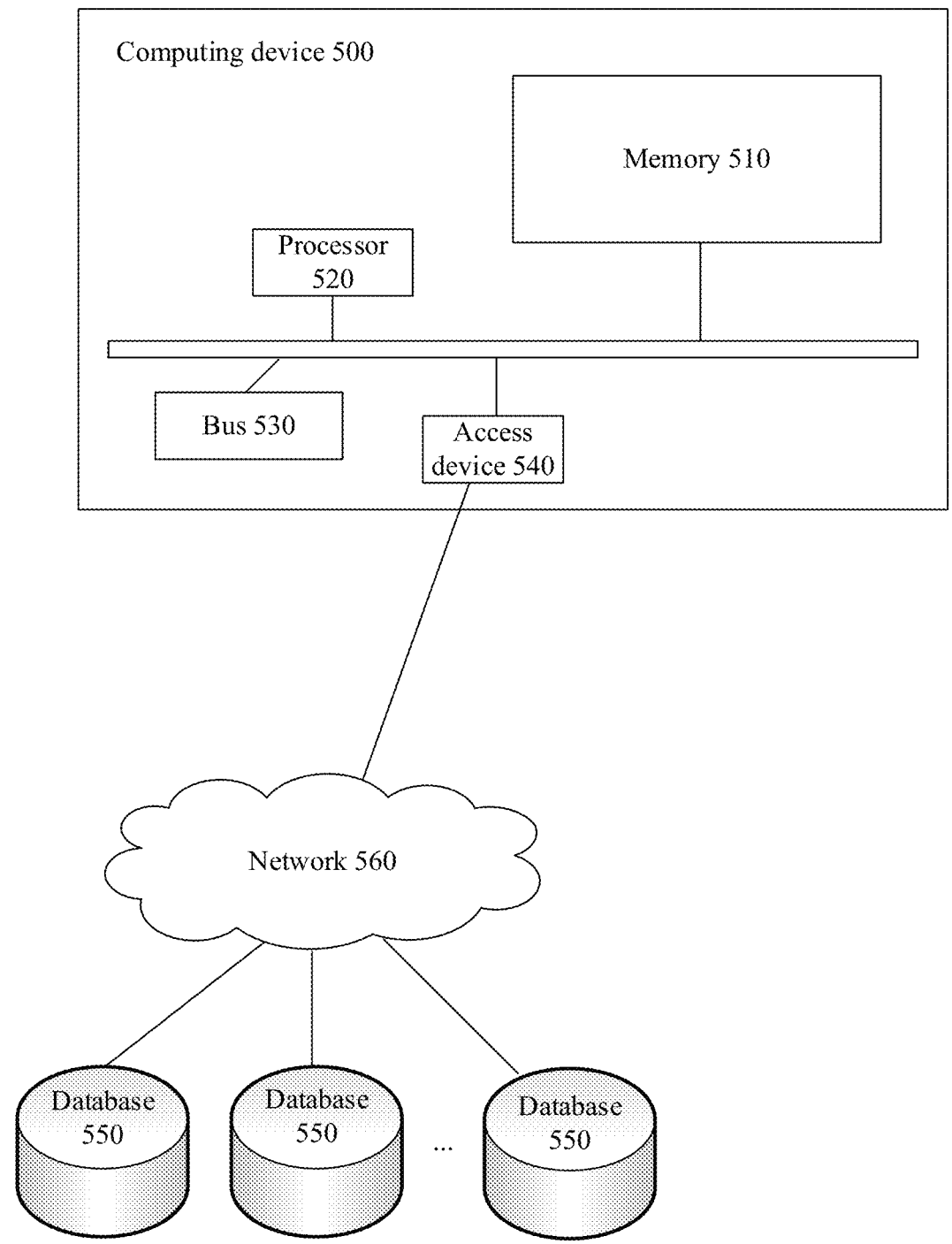
FIG. 5 is a block diagram of a structure of a computing device according to an embodiment of this application.

FIG. 5 is a block diagram of a structure of a computing device 500 according to an embodiment of this application. Components of the computing device 500 include but are not limited to a memory 510 and a processor 520. The processor 520 is connected to the memory 510 by using a bus 530, and a database 550 is configured to store data.

The computing device 500 further includes an access device 540. The access device 540 enables the computing device 500 to communicate via one or more networks 560. Examples of these networks include a public switched telephone network (PSTN), a local area network (LAN), a wide area network (WAN), a private area network (PAN), or a combination of communication networks such as the Internet. The access device 540 may include one or more of any type of wired or wireless network interfaces (for example, a network interface card (NIC)), such as an IEEE 802.11 wireless local area network (WLAN) wireless interface, a worldwide interoperability for microwave access (Wi-MAX) interface, an Ethernet interface, a universal serial bus (USB) interface, a cellular network interface, a Bluetooth interface, and a near field communication (NFC) interface.

In an embodiment of this application, the foregoing components of the computing device 500 and other components not shown in FIG. 5 may be connected to each other, for example, by using a bus. It should be understood that the structural block diagram of the computing device shown in FIG. 5 is merely used as an example instead of a limitation on the scope of this application. A person skilled in the art can add or replace other components as required.

The computing device 500 may be any type of stationary or mobile computing device, including a mobile computer or a mobile computing device (for example, a tablet computer, a personal digital assistant, a laptop computer, a notebook computer, or a netbook), a mobile phone (for example, a smartphone), a wearable computing device (for example, a smartwatch or smart glasses), another type of mobile device, or a stationary computing device, for example, a desktop computer or a PC. The computing device 500 may alternatively be a mobile or stationary server device.

When the processor 520 executes computer instructions, steps of the two-dimensional code-based data processing method are implemented.

The foregoing describes a schematic solution of a computing device in an embodiment. It should be noted that the technical solution of the computing device belongs to a same concept as the technical solution of the two-dimensional code-based data processing method. For details not described in detail in the technical solution of the computing device, refer to descriptions of the technical solution of the two-dimensional code-based data processing method.

An embodiment of this application further provides a computer-readable storage medium, where the computer-readable storage medium stores computer instructions, and when the computer instructions are executed by a processor, steps of the foregoing two-dimensional code-based data processing method are implemented.

The foregoing describes a schematic solution of a computer-readable storage medium in an embodiment. It should be noted that the technical solution of the storage medium belongs to a same concept as the technical solution of the two-dimensional code-based data processing method. For details not described in detail in the technical solution of the storage medium, refer to descriptions of the technical solution of the two-dimensional code-based data processing method.

An embodiment of this specification further provides a computer program, where when the computer program is executed on a computer, the computer is enabled to perform steps of the two-dimensional code-based data processing method.

The foregoing describes a schematic solution of a computer program product in an embodiment. It should be noted that the technical solution of the computer program belongs to a same concept as the technical solution of the two-dimensional code-based data processing method. For details not described in detail in the technical solution of the computer program, refer to descriptions of the technical solution of the two-dimensional code-based data processing method.

The foregoing describes specific embodiments of this application. Other embodiments fall within the scope of the appended claims. In some cases, actions or steps recorded in the claims may be performed in an order different from that in the embodiments and desired results may still be achieved. In addition, processes depicted in the accompanying drawings do not necessarily require shown specific orders or sequences to achieve the desired results. In some implementations, multitasking and parallel processing are also possible or may be advantageous.

The computer instructions include computer program code, and the computer program code may be in a source code form, an object code form, an executable file form, an intermediate form, or the like. The computer-readable medium may include: any entity or apparatus capable of carrying the computer program code, a recording medium, a USB flash drive, a removable hard disk, a magnetic disk, a compact disc, a computer memory, a read-only memory (ROM), a random access memory (RAM), an electrical carrier signal, a telecommunication signal, a software distribution medium, or the like. It should be noted that the content included in the computer-readable medium can be appropriately added or deleted depending on requirements of the legislation and patent practice in a jurisdiction. For example, in some jurisdictions, according to the legislation and patent practice, the computer-readable medium does not include an electrical carrier signal or a telecommunication signal.

It should be noted that, for brief description, the foregoing method embodiments are represented as a combination of a series of actions. However, a person skilled in the art should be aware that this application is not limited to the described order of the actions, because some steps may be performed in other orders or simultaneously according to this application. In addition, a person skilled in the art should also be aware that the embodiments described in this specification are all example embodiments, and used actions and means are not necessarily mandatory to this application.

In the foregoing embodiments, the descriptions of the embodiments have respective focuses. For a part that is not described in detail in a specific embodiment, refer to related descriptions in other embodiments.

The preferred embodiments of this application disclosed above are merely intended to help describe this application. In the optional embodiments, not all details are described in detail, and the present invention is not limited to only the specific implementations. Clearly, many modifications and variations may be made based on the content of this application. In this application, these embodiments are selected and specifically described to better explain the principle and actual application of this application, so that a person skilled in the art can well understand and use this application. This application is merely limited to the claims and a full scope and equivalents thereof.

What is claimed is:

1. A method of processing data based on two-dimensional codes, comprising:
   parsing a material to be parsed to obtain a two-dimensional code and a target material, wherein the two-dimensional code carries target label information indicating a hierarchical logical location of the target material in a particular storyboard structure comprising a story, a scene, and a shot, and wherein the material to be parsed comprises a video file including a label material and the target material, the label material containing the two-dimensional code at a preset position;
   recognizing the two-dimensional code to obtain the target label information by extracting and decoding the two-dimensional code from the label material using image recognition;
   storing the target material into a material library based on the target label information, wherein the material library is configured to store video materials associated with the target label information; and
   uploading the target material and its associated logical location information to a server for multi-user access.

2. The method according to claim 1, wherein the parsing a material to be parsed to obtain a two-dimensional code and a target material comprises:
   parsing the material to be parsed to obtain the target material and a label material comprising the two-dimensional code; and
   extracting the two-dimensional code from the label material.

3. The method according to claim 2, further comprising:
   obtaining the label material and the target material from the material to be parsed based on preset location information indicating a location of the two-dimensional code in the material to be parsed.

4. The method according to claim 2, wherein the parsing the material to be parsed to obtain the target material and a label material comprising the two-dimensional code comprises:
   obtaining the label material and the target material by recognizing the material to be parsed using an image recognition technology.

5. The method according to claim 2, wherein the method further comprises:
   deleting the label material after extracting the two-dimensional code from the label material.

6. The method according to claim 1, wherein the storing the target material into a material library based on the target label information comprises:
   determining the material library corresponding to the target label information; and
   storing the target material into the material library.

7. The method according to claim 1, further comprising:
   generating the two-dimensional code based on a data structure of a storyboard video editor; and
   generating the material to be parsed based on the two-dimensional code.

8. A computing device, comprising a memory, a processor, and computer instructions stored in the memory and executable by the processor, wherein the computer instructions, when executed by the processor, cause the processor to implement operations comprising:
   parsing a material to be parsed to obtain a two-dimensional code and a target material, wherein the two-dimensional code carries target label information indicating a hierarchical logical location of the target material in a particular storyboard structure comprising a story, a scene, and a shot, and wherein the material to be parsed comprises a video file including a label material and the target material, the label material containing the two-dimensional code at a preset position;
   recognizing the two-dimensional code to obtain the target label information by extracting and decoding the two-dimensional code from the label material using image recognition;
   storing the target material into a material library based on the target label information, wherein the material library is configured to store video materials associated with the target label information; and
   uploading the target material and its associated logical location information to a server for multi-user access.

9. The computing device according to claim 8, the operations further comprising:
   parsing the material to be parsed to obtain the target material and a label material comprising the two-dimensional code; and
   extracting the two-dimensional code from the label material.

10. The computing device according to claim 9, the operations further comprising:
    obtaining the label material and the target material from the material to be parsed based on preset location information indicating a location of the two-dimensional code in the material to be parsed.

11. The computing device according to claim 9, the operations further comprising:
    deleting the label material after extracting the two-dimensional code from the label material.

12. The computing device according to claim 8, the operations further comprising:
    generating the two-dimensional code based on a data structure of a storyboard video editor; and
    generating the material to be parsed based on the two-dimensional code.

13. A non-transitory computer-readable storage medium, wherein the computer-readable storage medium stores computer instructions, and wherein the computer instructions, when executed by a processor, cause the processor to implement operations comprising:
    parsing a material to be parsed to obtain a two-dimensional code and a target material, wherein the two-dimensional code carries target label information indicating a hierarchical logical location of the target material in a particular storyboard structure comprising a story, a scene, and a shot, and wherein the material to be parsed comprises a video file including a label material and the target material, the label material containing the two-dimensional code at a preset position;
    recognizing the two-dimensional code to obtain the target label information by extracting and decoding the two-dimensional code from the label material using image recognition;
    storing the target material into a material library based on the target label information, wherein the material library is configured to store video materials associated with the target label information; and uploading the target material and its associated logical location information to a server for multi-user access.

14. The non-transitory computer-readable storage medium according to claim 13, the operations further comprising:
parsing the material to be parsed to obtain the target material and a label material comprising the two-dimensional code; and
extracting the two-dimensional code from the label material.

15. The non-transitory computer-readable storage medium according to claim 14, the operations further comprising:
obtaining the label material and the target material from the material to be parsed based on preset location information indicating a location of the two-dimensional code in the material to be parsed.

16. The non-transitory computer-readable storage medium according to claim 14, the operations further comprising:
deleting the label material after extracting the two-dimensional code from the label material.

17. The non-transitory computer-readable storage medium according to claim 13, the operations further comprising:
generating the two-dimensional code based on a data structure of a storyboard video editor; and
generating the material to be parsed based on the two-dimensional code.

* * * * *